United States Patent [19]
Yamazaki et al.

[11] 3,946,605
[45] Mar. 30, 1976

[54] APPARATUS AND METHOD OF MEASURING FLUCTUATIONS OF EXCAVATED MUD AMOUNT IN A SLURRY LINE

[75] Inventors: Hironobu Yamazaki, Kashiwa; Reizo Kubota, Tokyo; Yoshiaki Uchida, Ichikawa; Taro Kasuya, Urawa; Norikazu Seki, Chiba, all of Japan

[73] Assignee: Tekken Kensetu Co. Ltd., Tokyo, Japan

[22] Filed: Nov. 7, 1974

[21] Appl. No.: 521,869

[30] Foreign Application Priority Data
Nov. 19, 1973  Japan.............................. 48-129202
June 4, 1974  Japan.............................. 49-63111

[52] U.S. Cl............................................. 73/155; 175/48
[51] Int. Cl.²........................................... E21B 45/00
[58] Field of Search ............... 73/153, 155; 175/48; 61/84; 299/1

[56] References Cited
UNITED STATES PATENTS

| | | | |
|---|---|---|---|
| 2,290,408 | 7/1942 | Crites................................. | 73/155 |
| 2,340,993 | 2/1944 | Smith.................................. | 73/155 |
| 2,966,059 | 12/1960 | Dower................................. | 73/155 |
| 3,002,379 | 10/1961 | Hurley................................. | 73/155 |
| 3,258,963 | 7/1966 | Bryant et al......................... | 73/155 |
| 3,602,322 | 8/1971 | Gorsuch............................... | 73/155 X |
| 3,613,806 | 3/1970 | Malott................................. | 175/48 |

*Primary Examiner*—Herbert Goldstein
*Attorney, Agent, or Firm*—Pierce, Scheffler & Parker

[57] ABSTRACT

An apparatus and method for measuring fluctuations in amount of soil in slurry or soil-containing fluid line. Each system of feeding the slurry typically to tunneling face and draining it therefrom in the slurry line is provided with gamma-ray densimeter and electromagnetic flow-meter to obtain respective amounts of soil only (dry-soil amounts) in the slurry flowing through each of said systems from respective outputs of these meters in each system, so that actually excavated amount through ground layer of a shielded excavator at the tunneling face can be measured by the difference between the respective dry-soil amounts. The excavator will be advanced depending on this measured amount.

12 Claims, 10 Drawing Figures

APPARATUS AND METHOD OF MEASURING FLUCTUATIONS OF EXCAVATED MUD AMOUNT IN A SLURRY LINE

This invention relates to an apparatus for measuring an accurate amount of increases and decreases of soil or the like contained in a slurry flowing through a slurry line and, more particularly, to an apparatus and method for accurately measuring, in the excavation at shielded slurry type tunneling face, the actually excavated amount of soil or the like on the basis of the respective measured values of soil or the like only which is contained in the slurry flowing through both of feed and drain pipes of the slurry line. The term "slurry line" herein used is intended to mean mainly a passage through which the slurry, and a slurry and soil mixture, are to flow, but passage may also be the one for flowing clear water in the feeding side and soil-containing water after the excavation in the draining side.

The slurry shielding excavation or tunneling through a soft ground of, in particular, a highly water containing sand and gravel layer has been considered to be one of the most difficult works because, in case the density of spoil or the amount of mud in the slurry flowing through a slurry feeding and draining line increases or decreases, the increased or decreased amount has not been instantaneously measured or integratively accurately measured and, for this reason, an appropriate propelling amount for excavating device has been unable to be determined and any completely automated operation of the slurry shielding excavation or tunneling has not been achievable.

In conventional excavating or tunneling operations of the kind referred to, in general, the whole mud amount sent out through drain pipe is measured and the excavated amount is presumed from such measurement, but the amount of slurry fed in through feed pipe is not considered. Therefore, the presumed value of the excavated amount has been inaccurate and undependable.

The present invention has been designed to solve the above mentioned problem. In the present invention, the problem is solved by determining the actually excavated amount of soil, sand, gravel and the like of their mixture (which shall be referred to as "soil" hereinafter for simplicity) from the difference between the respective amounts of the soil only contained in the slurry measured with respect to each of the feed and drain pipes after measuring the respective densities of the soil and entire flow volumes of the fluids flowing through the feed and drain pipes of the slurry line.

A principal object of the present invention is, therefore, to provide an apparatus that enables one to measure the amount of soil excavated more accurately and momentarily by measuring the dry-sand amounts in both of the feed and drain pipes of the slurry line.

A further object of the present invention is to provide a soil amount measuring method for enabling a substantially automated remote control of a shielded slurry type excavator by applying such measuring apparatus as provided by the principal object of the invention to the excavator, so that the tunneling operation can be carried out while measuring the excavated soil amount at the tunnel face and the excavated volume at the tunnel face and the propelling volume of the shield type excavator can be aptly made to coincide with each other, thereby any outbreak or accidental ground break at the tunnel face can be definitely sensed, so that any collapse of the ground at the tunnel face or the like accident can be prevented.

The present invention shall now be explained in detail with reference to certain preferred embodiments illustrated in accompanying drawings, in which.

Figure 1:
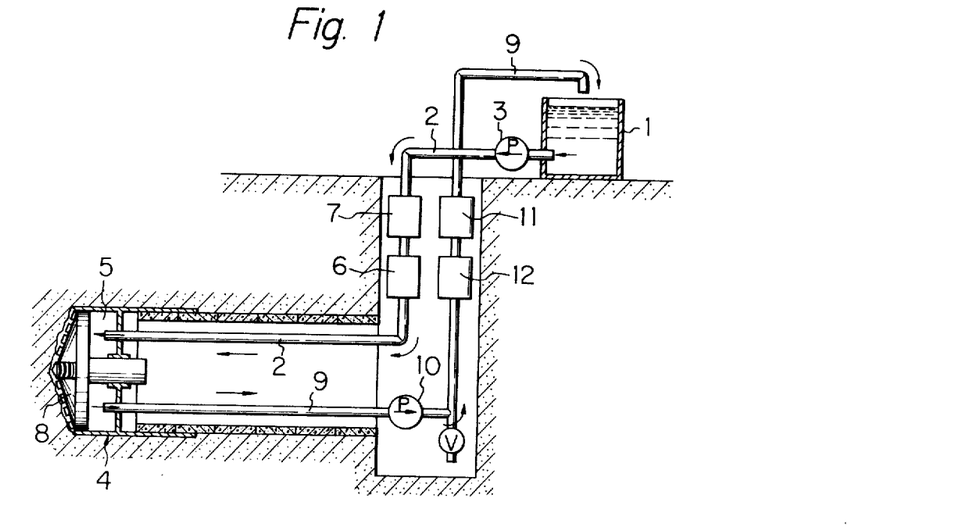
FIG. 1 shows schematically an excavating apparatus provided with an embodiment of the measuring apparatus according to the present invention.

Referring first to FIG. 1, a slurry (prepared, for example, by adding several percent bentonite by weight to clear water and used for preventing any collapse at tunnel face in a soft ground) in a water tank 1 is fed to a pressure chamber 5 at the tunnel face of an excavator 4 by a pump 3 through a feed pipe 2 provided with a gamma-ray densimeter 6 for measuring the density of the slurry and an electromagnetic flow transmitter 7 for measuring the flow volume of the slurry.

Before proceeding to further disclosures, certain definitions of the terms hereinafter used shall be made here for the purpose of clarity.

The term "slurry" shall mean the fluid consisting of water containing a material effective in preventing the tunnel face collapse such as the bentonite or the like, and this slurry is the one to be initially fed to the excavator 4 at the tunnel face.

When the excavation is initiated at the tunnel face, the soil so defined in the foregoing that forming the ground layer to be excavated is added to the slurry at the pressure chamber 5, and this mixture of the slurry and soil excavated to be drained shall be referred to as "mud." In continuing the excavation, this mud is preferably to be returned to the slurry feed after filtering soil particles of large grain sizes out of the mud to leave therein only fine particles of the soil, but such mud returned with the fine particles only after adding water if conditions require shall be also referred to as the slurry.

The amount of the soil thus contained in the slurry as well as in the mud except that of water is to be measured and such measured amount of only the soil with respect to either of the slurry and mud shall be called "dry-soil amount."

The soil excavated with a cutter 8 of the excavator and the fed slurry are mixed together and are drained as the mud of a high concentration out of the tunnel by a drain pump 10 through a drain pipe 9 provided with a gamma-ray densimeter 11 for measuring the density of the drained mud and an electromagnetic flow transmitter 12 for measuring the flow volume of the mud.

While in the drawing the draining end of the pipe 9 is shown as connected to the tank 1 for the purpose of simplicity, it should be understood that in practice a slurry of water and bentonite or the like is initially fed to the pipe 2 and after the excavation is started the drained mud, subjected to a treatment to remove large grain soil particles, is fed to the feed pipe 2.

Figure 2:
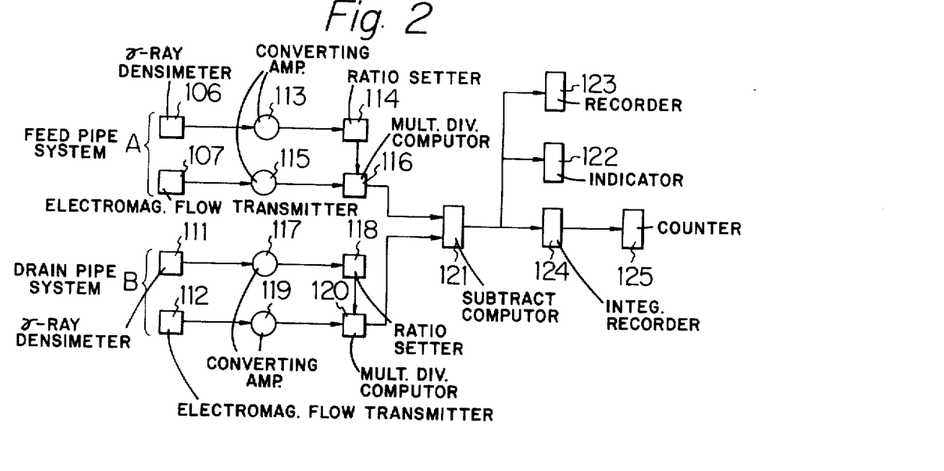
FIG. 2 is a block diagram of the measuring apparatus in the embodiment shown in FIG. 1.

In FIG. 2 showing a block diagram of the measuring apparatus according to the present invention for determining in the embodiment of FIG. 1 the excavated dry-soil amount, a group denoted by A shows a feed pipe system, a group denoted by B a drain pipe system, 106 is a gamma-ray densimeter provided in the feed pipe and 107 is an electromagnetic flow transmitter. The output current which is obtained from the densimeter and which is a function of the density of the slurry flowing through the feed pipe is converted to an alternating current and then amplified by a converting amplifier 113 and is again converted to a direct current signal. This signal representing the slurry density, is then transmitted to a ratio setter 114, whereby a density of slurry $$\frac{(\gamma-1)\cdot\gamma_o}{\gamma_o-1}$$

Figure 4A:
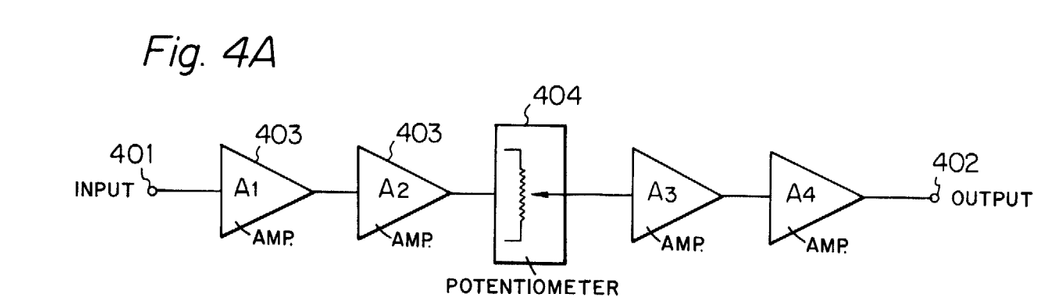
FIGS. 4A and 4B respectively show an exemplary block diagram and its practical circuit diagram of ratio setter used in the present invention.
Figure 4B:
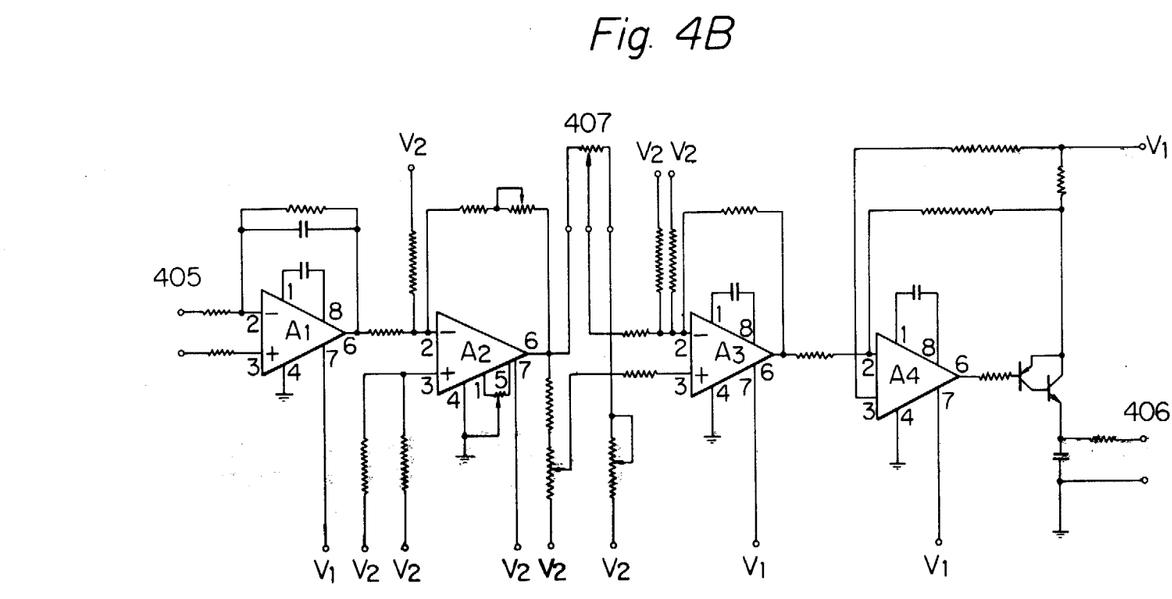

(wherein $\gamma$ is a slurry density value measured by the gamma-ray densimeter and $\gamma_0$ is a true specific gravity value of the soil in the ground at the site of tunneling excavation determined by preliminarily performed trial excavations) is determined, as will be referred to more in detail with reference to FIGS. 4A and 4B. On the other hand, an output signal from the electromagnetic flow transmitter 107 showing flow amount of the slurry is also amplified and converted to a direct current signal by a converting amplifier 115 and the product of this output signal and the output signal of the ratio setter 114 is determined by a multiplication and division computor 116. This product value represents a dry-soil amount in the slurry flowing through the feed pipe.

111 is a gamma-ray densimeter provided in the drain pipe, 112 is an electromagnetic flow meter, 117 and 119 are converting amplifiers, and 118 is ratio setter. 120 is a multiplication and devision computor the performance of which is the same as that of the above described feed pipe side and the output signal of which, therefore, indicates a dry-soil amount in the mud flowing through the drain pipe.

The outputs of both multiplication and division computors 116 and 120 are given to the addition and subtraction computor 121, and an actually excavated dry-soil amount is determined by the difference between both signals and this difference signal is given to an indicator 122, recorder 123 and integrated recorder 124. 125 is a counter showing an integrated value of excavated dry-soil amount.

In the above mentioned block diagram, the multiplication and division computors 116 and 120 and addition and subtraction computor 121 to be utilized can be of any well known formations.

The reason why the fixed computation of $$\frac{(\gamma-1)\cdot\gamma_o}{\gamma_o-1}$$

is made by the ratio setter for the direct current signal obtained by the gamma-ray densimeter shall be explained in the following.

In order to determine an excavated amount of mud which is measured in weight by using the apparatus of the present invention, the following calculating formulas are used.

Now, the following notations are defined:

$G_1$: Dry-soil weight (t/H) in the slurry flowing through the feed pipe.

$Q_1$: Slurry quantity (m$^3$/H) flowing through the feed pipe.

$\gamma_1$: Density (t/m$^3$) of the slurry flowing through the feed pipe.

$\gamma_o$: True specific gravity (t/m$^3$) of the soil being evacuated $G_2$: Dry-soil weight (t/H) in the mud flowing through the drain pipe.

$Q_2$: Mud quantity (m$^3$/H) flowing through the drain pipe.

$\gamma_2$: Density (t/m$^3$) of the mud flowing through the drain pipe.

g: Actually excavated dry-soil weight (t/H).

In the above, the value of $\gamma_o$ is of a true specific gravity of the soil being evacuated which is determined by a known method on a sample or samples of the soil taken as a result of making a test excavation at a fixed interval along a predetermined work line.

The specific gravity of soils is generally in the range of about 2.50 to 2.70, except those of such special soils as organic soil, loam or the like and can be considered as being of about 2.65. In the ratio setters in the respective feed and drain pipes, the specific gravity value $\gamma_o$ of the soil being excavated which is generally of the above level but of course dependent on the actual test measurement to be set. Precisely, in the very beginning of the excavation, the set value $\gamma_o$ for the feed pipe is to be based on a specific gravity value of the bentonite or the like in the slurry which is typically 2.30 or so, while the $\gamma_o$ for the drain pipe is to be the value of the soil being excavated which is in the above described range. During the excavation, which is continued using the mud treated as described in the foregoing and fed to the feed pipe after the mud starts to be drained, the fine particles of the mud are added to the slurry in the feed pipe while such additive as the bentonite or the like is reduced from the slurry at the same time when the large grain soil particles are filtered from the drained mud. However, it is not necessary to supplement the additive to the slurry fed as long as the amount of the fine particles of the soil added to the slurry is adequately regulated by any proper known means as the excavation advances. This is true because such fine soil particles are also effective for penetrating into the ground layer at the tunnel face so as to prevent it from collapsing. Therefore, in obtaining the dry-soil amount being actually excavated, it is not only advantageous in economical view but also more effective in practice in obtaining more accurate dry-soil amount to employ the specific gravity $\gamma_o$ of the soil being excavated in the calculation than that of the additive in the slurry; it is, of course, necessary to correct the set value $\gamma_o$ for the feed pipe in case any difference is remarkably large between the specific gravities of the fine soil particles retained and the large grain soil particles removed.

Assuming that a "dry-soil" of an amount $G_i$(t/H) is contained in a slurry or mud of an amount $Q_i$ (m$^3$/H), the density $\gamma_i$ of the slurry or mud will be represented by the following formula:

$$yi = \frac{(Q_1 - \frac{G_1}{\gamma_o}) \times 1 + G_1}{Q_1}$$

wherein the density of water is made to be 1 t/m³. $G_1$ is determined from the above formula, $$G_1 = Q_1 \cdot \frac{(\gamma_1 - 1) \cdot \gamma_o}{\gamma_o - 1}$$

will be obtained. Therefore,
Dry-soil weight in the fed slurry is:

$$G_1 = Q_1 \frac{(\gamma_1 - 1) \cdot \gamma_o}{\gamma_o - 1} \qquad (1)$$

Dry-soil weight in the drained mud is:

$$G_2 = Q_2 \frac{(\gamma_2 - 1) \cdot \gamma_o}{\gamma_o - 1} \qquad (2)$$

Using the above formulas (1) and (2), the dry-soil weight of actually excavated soil is obtained as $$G = G_2 - G_1 \ldots \qquad (3)$$

Here, the formula (1) is a value obtained from the computor 116, the formula (2) is a value obtained from the computor 120 and the formula (3) is a value obtained from the computor 121. Further, in the formula (1), $Q_1$ is a value obtained from the converting amplifier 115 and $$\frac{(\gamma_1 - 1) \cdot \gamma_o}{\gamma_o - 1}$$

is a value obtained from the ratio setter 114. It is necessary to calculate $$\frac{(\gamma_1 - 1) \cdot \gamma_o}{\gamma - 1}$$

by inserting the value of $\gamma_o$ obtained from the sample soil into the ratio setter on the basis of the value of $\gamma_1$ obtained from the converting amplifier 113.

The respective examples of the above referred densimeter flow-meter, ratio setter and multiplication and division computor used in the present invention shall be explained next in the following. However, these may be of any conventional devices other than those described as long as they perform the same purposes and, therefore, it will not be necessary to explain them specifically in detail.

Figure 3A:
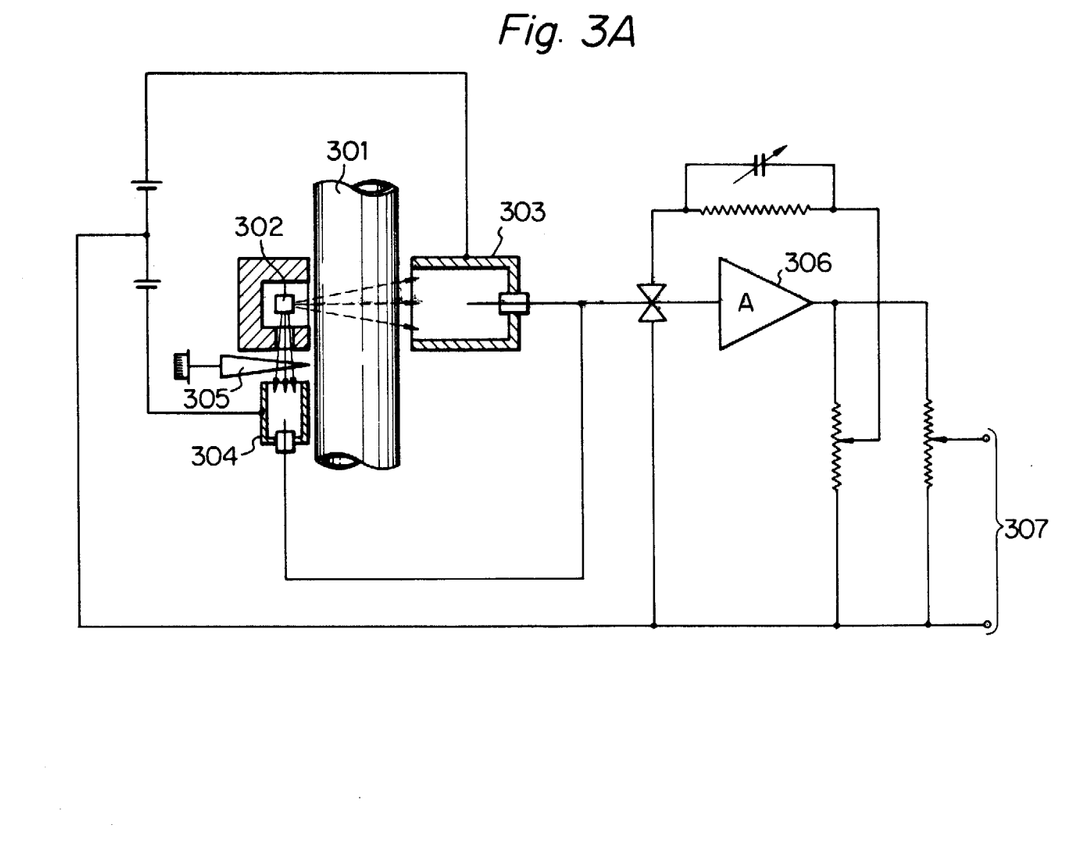
FIGS. 3A and 3B respectively show an exemplary block diagram and its practical circuit diagram of gamma-ray densimeter used in the present invention.
Figure 3B:
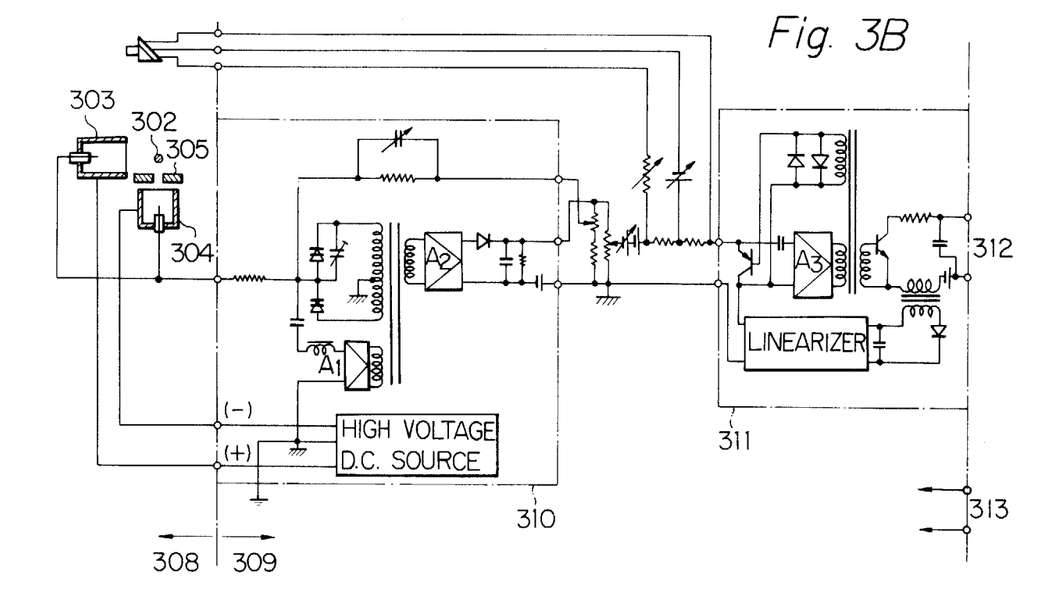

FIGS. 3A and 3B shows in a block diagram, and a circuit diagram an example of the γ-ray densimeter used in the present invention. Now in FIG. 3A, 301 is a feed or drain pipe for the slurry to be detected, 302 is a gamma-ray source, 303 is an ionization chamber on the side of measuring the gamma-ray passed through the pipe, 304 is an ionization chamber on the side of setting the source gamma-ray intensity, 305 is a zero value setting section, 306 is a converting amplifier and 307 is an output side. In FIG. 3B, 308 and 309 are respectively a detector side and a converter side of the densimeter, 310 is a converting amplifier, 311 is a millivolt-milliampere converter. 312 are output terminals and 313 are current source terminals. The respective signal currents provided from the both ionization chambers 303 and 304 are different in their level from one another and thus the difference current of these signal currents represents the density of the slurry or mud flowing through the pipe. Such difference current is transmitted to the output terminals 312 through the converting amplifier 310 and millivolt-milliampere converter 311.

While according to the present invention the propelling amount of the excavator is determined on base of the actual amount of soil being excavated as measured by comparing the respective densities of the slurry and mud with respect to both of the feed and drain pipes and their respective flow amounts, such density values do not always represent accurate density with reference to the soil expelled from the site where the excavation is being actually made, since the soil components or their composition may vary momentarily during the excavation advances or even a slurry containing certain amount of mud from other site or sites already excavated may possibly be utilized as the slurry to be fed. Therefore, in order to render such measured values to approximate as close as possible the accurate density values, it is desirable to obtain the density of the soil actually being excavated depending on average specific gravity value $\gamma_o$ of the soil of the ground at the current excavating site. Such average is obtained by preliminary test boring performed along the working line, and by the use of such ratio setter as shown in FIGS. 4A and 4B.

In the block diagram of FIG. 4A showing an example of the ratio setter used in the present invention, 401 is an input side of the setter, 402 is an output side thereof, 403 is a group of amplifiers $A_1$ to $A_4$, and 404 is a potentiometer for setting the average specific gravity value $\gamma_o$ therein. The difference current from the output terminals 307 or 312 of the densimeter as shown in FIG. 3A or 3B is provided to the input side 401, which current is two-stage amplified by the amplifiers $A_1$ and $A_2$ and is then corrected by the $\gamma_o$ value preliminarily given to the potentiometer 404. This corrected value is again amplified by the amplifiers $A_3$ and $A_4$ and is provided to the output side 402. In FIG. 4B showing a practical circuit diagram of the ratio setter, 405 are input terminals, 406 are output terminals, $A_1$ through $A_4$ are amplifiers, and 407 is the potentiometer, respective which correspond to 401, 402 and 404 in FIG. 4A.

Figure 5A:
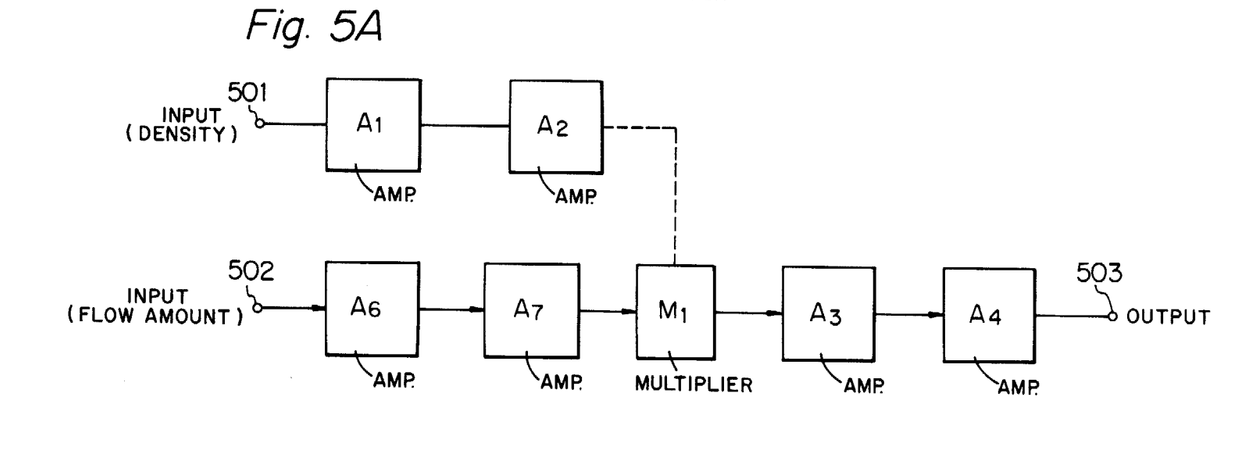
FIGS. 5A and 5B show respectively an exemplary block diagram and its practical circuit diagram of multiplication and division computor used in the present invention.
Figure 5B:
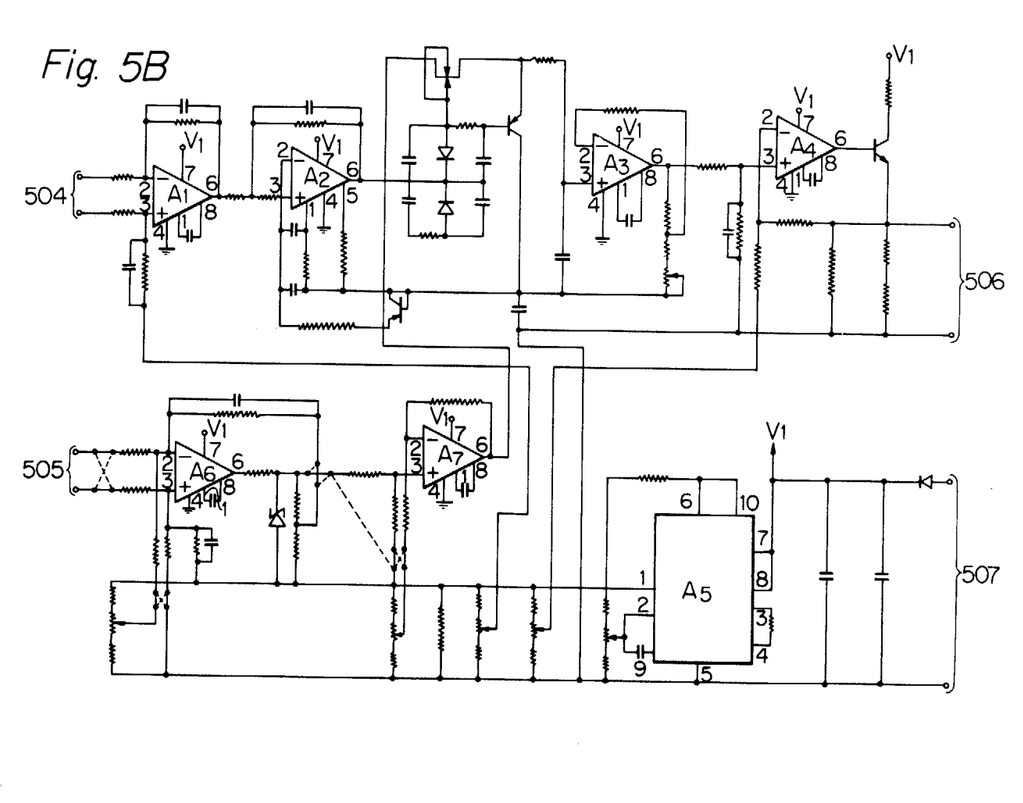

FIGS. 5A and 5B are respectively a block diagram and a practical circuitry arrangement of an example of the multiplication and division computor used in the present invention. In the block diagram of FIG. 5A, 501 is an input side of the computer for receiving a signal representing the slurry or mud density from the output terminals 402 or 406 in FIG. 4A or 4B, 502 is an input side for receiving a signal representing the slurry or mud flow amount from such an electromagnetic flow meter as will be described later with reference to FIG. 6, $M_1$ is a multiplier for multiplying the respective said signals which are amplified through amplifiers $A_1$ and $A_2$ and $A_6$ and $A_7$, respectively, to a voltage level suitable for the computing operation, $A_3$ and $A_4$ are amplifiers for amplifying an output from the multiplier again to a proper voltage level, and 503 is an output side of the computor. In FIG. 5B, input terminals 504 correspond to the input side 501 in FIG. 5A, input terminals 505 to the input side 502, $A_1$ through $A_4$ and $A_6$ and $A_7$ to the amplifiers having the same references, and output terminals 506 to the output side 503, respectively. $A_5$ is an amplifier for setting source voltage from an AC source 507 to proper voltage levels to be distributed to the respective amplifiers and multiplier disposed between amplifiers $A_2$ and $A_3$.

Figure 6:
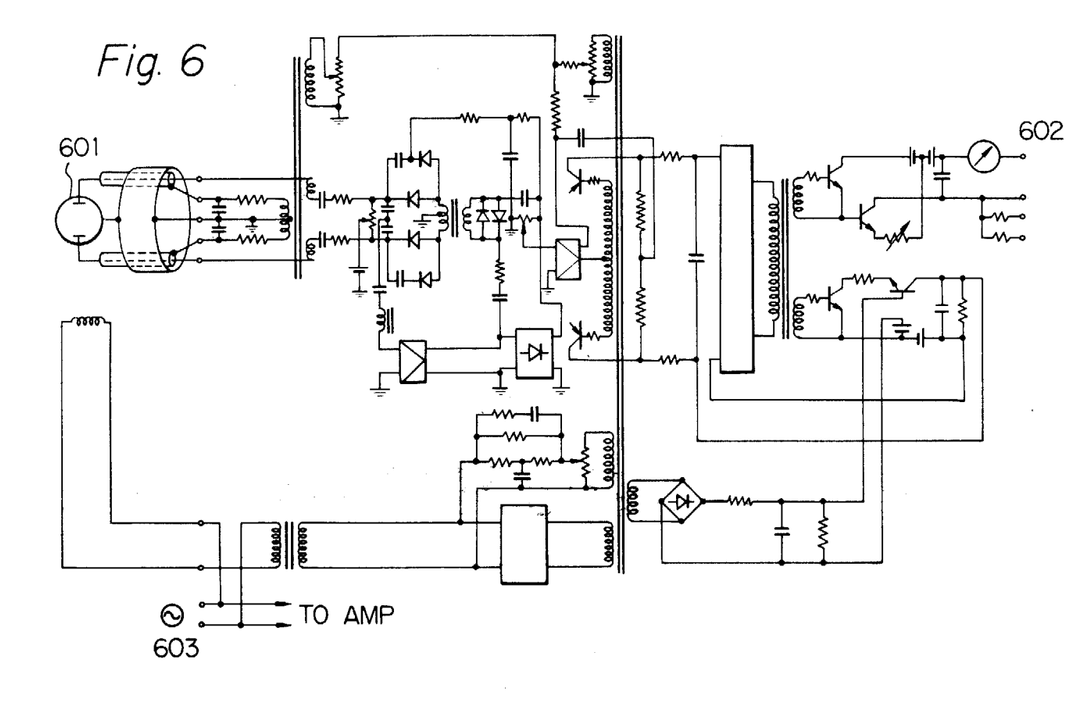
FIG. 6 shows an exemplary circuit diagram of electromagnetic flow meter used in the present invention.

In FIG. 6 showing an example of the electromagnetic flow meter in a circuit diagram to be used in the present invention, 601 is a detecting section, 602 are output terminals, and 603 is an AC source. The slurry or mud passing pipe is placed within an AC magnetic field at the detecting section 601 and an electromotive force obtained in the field in proportion to a velocity of the slurry or mud flowing through the pipe is amplified through a differential-input feedback and amplifying circuit to an AC signal which is proportional to the electromotive force. This Ac signal is synchronised and rectified at the same phase with the magnetic flux density and is then divided by the flux density at a dividing circuit, so that the electromotive force representing the slurry or mud flow amount is transmitted to the output terminals 602 so as to be provided to the multiplication and division computer as in FIG. 5A or 5B, as a DC signal proportional to the flow amount and regardless of the flux density.

Now, in propelling the shielded excavator body 4 in FIG. 1 for further advancing the excavating or tunneling operation with the excavator provided with the measuring apparatus of the present invention, as the actual excavated soil amount at the tunnel face is known based on the measured value obtained in the manner described in the foregoing, such a propelling mechanism for the excavator body as, for example, an oil jack (not illustrated) can be operated to propel the excavator body by the actual excavated soil amount in the tunnel face. Therefore, the propelling mechanism of the excavator can be remote-controlled while observing a meter board coupled to the measuring apparatus of the present invention. According to the results of experiments made by the present inventors, it is revealed that, in the cases of feeding a slurry of which dry-soil amount is in the range of 3–7 % to the feed pipe for tunneling through high water containing quicksand and silt layers with the slurry shield type excavator, the dry-soil amount in the mud outcoming from the drain pipe which fluctuates in the range of 15 to 30 % can be measured utilizing the measuring apparatus of the present invention.

Figure 7:
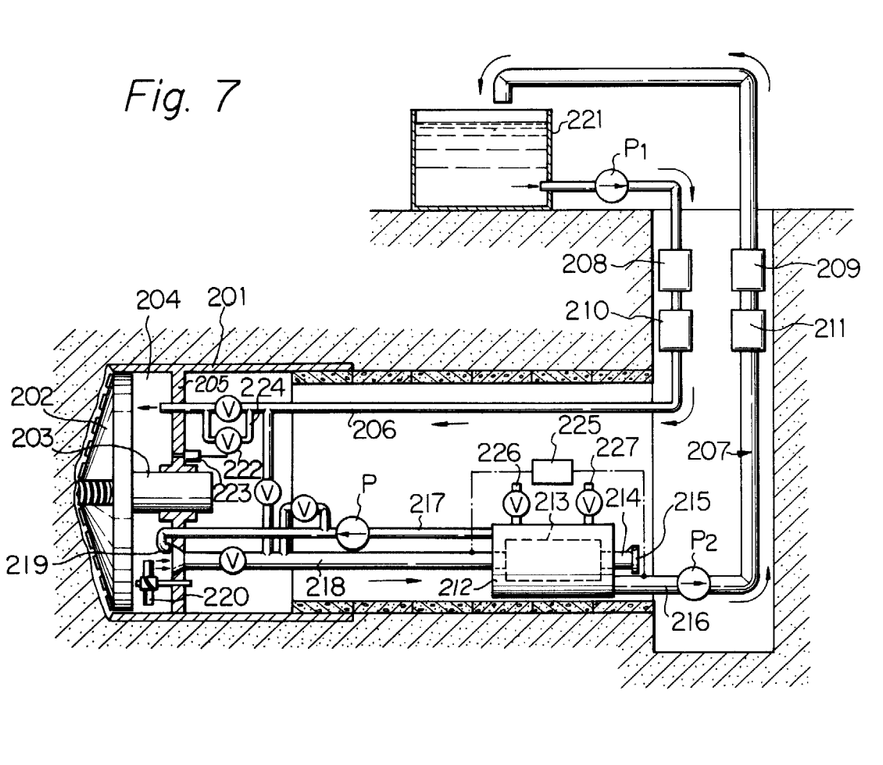
FIG. 7 schematically shows and excavating apparatus using another embodiment of the measuring apparatus of the present invention.

In FIG. 7 showing another embodiment to which the present invention is applied, a cutter head 202 provided with a rotary shaft 203 is set in a slurry shield type excavator body 201. Driving means for the cutter head 202 is not illustrated. Behind the cutter head 202, there is provided a pressure chamber 204 for feeding a slurry through the head to the tunnel face and for receiving the slurry together with excavated soil again. For this purpose, a partition wall 205 of the chamber 204 is connected with a slurry feed pipe 206 and drain pipe 207 which are provided respectively with a gamma-ray densimeter 208 or 209 and with an electromagnetic flow meter 210 or 211 of the measuring apparatus of the present invention. Further, in this embodiment, the drain pipe 207 which comprises a first section 218 and a second section 216 is of a large caliber so as to allow soil components of large grain sizes to be conveyed. Such a grain size separating means as, for example, a separator 212 containing a trommel 213 rotatably in a sealed tank is connected at outer end of the first drain pipe section 218 and the trommel 213 is provided with a drain port 214 having a lid 215. The mud which contains soil components of small grain sizes having passed through the trommel 213 is discharged out of the tunnel through a second drain pipe section 216 and a pump $P_2$. The separator is connected with the pressure chamber 204 through a pump $P_3$ and a slurry feedback pipe 217 which forming at the tip an injection port 219 opening toward intake port of the first drain pipe section 218 in the pressure chamber 204. The fed-back slurry injected out of the injection port 219 renders the intake of the slurry containing excavated soil to be smooth, together with an agitator 220 driven by a motor (not shown). $P_1$ is a pump for feeding the slurry through the feed pipe 206 from a slurry tank 221 into the pressure chamber 204. 222 is an automatic valve provided in a by-pass pipe 224 of the feed pipe 206 and actuated by a pressure indicating and adjusting device 223 provided in the partition wall 205, for the purpose of adjusting and maintaining a desired pressure of the slurry in the tunnel face. 225 is an alarm device provided so as to indicate any difference between the pressure in the first drain pipe section 218 and the pressure in the second drain pipe section 216 so that the clogging of the trommel 213 will be warned. 226 is an air exhaust pipe normally closed by a valve. 227 is a pipe having a valve for feeding a slurry to the separator 212 when desired.

According to this embodiment, when such soil component as gravels of large grain sizes taken into the pressure chamber 204 have come near the intake port of the first drain pipe section 218 of a large caliber as agitated by the agitator 220, they will be effectively pushed into the drain pipe by the injected slurry from the injection port 219. If there is none of such injected flow, it will be difficult to convey any larger size stones. Further according to this embodiment of FIG. 7, even if excavated soil contains larger size stones, the measuring apparatus will be able to be driven without any trouble to measure an excavated soil amount. In this case, for the purpose of taking into consideration the large grain soil components retained in the separator 212, such a measure may be taken up that, for example, the densimeter 209 of the drain pipe will be disposed in the first drain pipe section 218, the densimeter output will be properly corrected depending on signal levels to the alarm device 225 showing the slurry pressure difference before and after the separator, and so on.

While the present invention has been described in the foregoing mainly with reference to the case where the invention is applied to the slurry shield type excavator in which a slurry is fed to the tunneling face and the mud containing additional excavated soil from the face, it should be appreciated that the slurry fed to the face may be replaced by a clear water depending on the nature of ground to be excavated or any working conditions, or even the apparatus of the present invention may be applied to any other cases than the slurry shield type excavator disclosed.

What is claimed is:

1. An apparatus for measuring fluctuations of solid body amount passed through a fluid path, which comprises feed and drain systems forming said fluid path, means positioned intermediate between respective said feed and drain systems for adding a solid body to said fluid; means provided in each of the feed and drain systems for measuring densities of the fluid passing through each system, means connected to said density measuring means in each of the systems for converting measured density value to a rate with respect to a preliminarily measured specific gravity of the solid body added by said adding means, means provided in each of the feed and drain systems for measuring entire flow amount of the fluid passing through each system, means connected to respective said density value converting means and flow amount measuring means in each system for obtaining from respective outputs of these means an amount only of the solid body in the fluid passing through each system, and means connected to respective said means for obtaining the solid body amount in each system for obtaining any difference between the solid body amounts of the respective systems and thereby calculating fluctuations in the amount of the solid body added to the fluid by the solid body adding means.

2. The apparatus according to claim 1 wherein said means for obtaining the solid body amount is a multiplication and division computer for obtaining a product of an output value of said converting means and an output of said flow amount measuring means, and said calculating means is a subtraction computer for computing differences between the respective output values from said multiplication and division computers in both of the feed and drain systems.

3. the apparatus according to claim 2 wherein said density measuring means is a gamma-ray densimeter and said converting means is a ratio setter.

4. The apparatus according to claim 2 wherein converting means is adapted to obtain $$\frac{(\gamma-1)\cdot\gamma_o}{\gamma_o-1}$$

by a constant $\gamma_o$ given in advance and a measured density value $\gamma$ of the fluid.

5. An apparatus for measuring fluctuations of evacuated soil amount in a slurry line, which comprises a shielded type excavator for excavating ground forming soil, a feed pipe for feeding a slurry to said excavator and provided with means for measuring densities of said slurry and means for measuring flow amounts of the slurry flowing therethrough, means connected to said density measuring means of the feed pipe for converting measured density value of the slurry to a ratio with respect to an average specific gravity of said soil, a drain pipe connected to said excavator for draining a mud consisting of the slurry and said soil excavated and provided with means for measuring densities of said mud and means for measuring flow amounts of the mud flowing therethrough, means connected to said density measuring means of the drain pipe for converting measured density value of the mud to a ratio with respect to said average specific gravity of the soil, means connected to said converting means and flow amount measuring means of the feed pipe for obtaining dry-soil amount contained in the slurry from respective output values of the respective said means, means connected to said converting means and flow amount measuring means of the drain pipe for obtaining dry-soil amount contained in the mud from respective output values of the respective said means, and means connected to respective said dry-soil amount obtaining means of the feed and drain pipes for calculating fluctuations in the excavated soil amount on base of any difference between respective said dry-soil amounts measured with respect to the respective feed and drain pipes.

6. The apparatus according to claim 5 wherein said means for obtaining the respective dry-soil amounts are a multiplication and division computer for obtaining a product of the respective output values of said converting means and flow amount measuring means, and said calculating means is a subtraction computer connected to respective said multiplication and divisions computers of the respective feed and drain pipes for obtaining the difference between the respective outputs of these computers.

7. The apparatus according to claim 6 wherein said converting means is adapted to obtain $$\frac{(\gamma-1)\cdot\gamma_o}{\gamma_o-1}$$

by a constant given in advance and a measured density value $\gamma$ of the fluid.

8. The apparatus according to claim 5 wherein said drain pipe for the fluid and excavated mud is provided with means for separating the mud of large grain sizes from fine mud to drain them separately.

9. The apparatus according to claim 5 which further comprises a branch pipe for the fluid, an end of said branch pipe is opened toward and end of said drain pipe terminating in the excavator, and said opened end of the branch pipe is adapted to form a high pressure jet stream of the branched fluid into the drain pipe.

10. The apparatus according to claim 5 wherein said drain pipe is of a larger diameter than said feed pipe and is provided with a separator for separating the mud of large grain sizes from fine mud both to be drained, said separator is provided with a branch pipe for feeding back a part of the fluid in the drain pipe into the excavator, and said branch pipe forms at its end terminating in the excavator a high pressure jetting nozzle opened toward an end of the drain pipe terminating in the excavator.

11. A method of measuring fluctations in amounts of solid body added to a path of a fluid intermediate between a feed system and a drain system of said path, which comprises steps of measuring at each of said systems densities of said solid body in said fluid and flow amounts of the fluid flowing the systems, converting said measured density values for each of the systems to a ratio with respect to a preliminarily measured average specific gravity of the solid body to be added, obtaining for each system a product of said converted ratio value and said measured flow amount value to determine an amount of only the solid body in the fluid passing through the system, and calculating any difference between respective said determined solid body amounts for the respective systems to obtain an actual amount of the solid body added to the fluid path.

12. An automatic shielded type slurry excavating method comprising the steps of measuring densities of any solid body contained in a slurry and flow amounts of said slurry fed through a feed pipe for said slurry to a shielded excavator, measuring densities of a mud consisting of excavated soil by said excavator and the fed slurry and flow amounts of said mud passing through a drain pipe for the mud, converting said measured density values at the respective said fed and drain pipes to a ratio with respect to a preliminarily measured specific gravity of said soil, obtaining products of the respective said converted values and measured flow amount values for the respective feed and drain pipes to determine dry-soil amounts contained in the respective slurry and mud, calculating any differences between said dry-soil amounts in the slurry and mud, obtaining a momentary dry-soil amount actually excavated by the excavator by means of said calculated difference value, accumulating a plurality of said momentary dry-soil amounts, and determining an amount for propelling the excavator on base of said momentary dry-soil amount and accumulated dry-soil amounts.

* * * * *